United States Patent
Rebertus

[15] 3,692,771
[45] Sept. 19, 1972

[54] PROCESS FOR PREPARING DIFLUORODIAZIRINE
[72] Inventor: Robert L. Rebertus, Mendota Heights, Minn.
[73] Assignee: Minnesota Mining & Manufacturing Company, St. Paul, Minn.
[22] Filed: Oct. 16, 1964
[21] Appl. No.: 405,026

[52] U.S. Cl....................260/239 AA, 260/583 NH
[51] Int. Cl..............................................C07d 45/00
[58] Field of Search.......................260/239, 239 AA

[56] References Cited
UNITED STATES PATENTS
2,944,051   7/1960   Graefe......................260/239

OTHER PUBLICATIONS
Hoffman et al., Chem. Reviews, Vol. 62, pp. 13 & 14, (1962) QD1 A563

Primary Examiner—Leland A. Sebastian
Attorney—Frank A. Steldt, Donald C. Gipple and Temple Clayton

EXEMPLARY CLAIM

1. A process for the production of difluorodiazirine comprising the steps of
I. reducing difluorobis(difluoramino)methane with tetra-lower alkyl quaternary ammonium iodide or anion exchange resin comprising quaternary ammonium groups and iodide anions and
II. recovering difluorodiazirine as a product of the reaction.

4 Claims, No Drawings

PROCESS FOR PREPARING DIFLUORODIAZIRINE

This invention relates to a new and valuable method for the manufacture of difluorodiazirine, $CF_2N_2$.

The compound difluorodiazirine is a valuable reactant for organic syntheses. It has heretofore been made by reaction of bis(difluoramino)difluoromethane with ferrocene in carbon tetrachloride or by potassium iodide in mixtures of acetonitrile and water. The former procedure uses a relatively inaccessible reagent and the latter procedure suffers from the disadvantages that even in the presence of 5 percent of water, which is necessary to give reasonable solubility to the potassium iodide, the yield is very low, and potassium fluoride precipitates making workup difficult.

It is one object of this invention to provide an improved method for the production of difluorodiazirine.

A further object of this invention is to provide a method for the production of difluorodiazirine in more readily purified form.

Other objects of the invention will become evident hereinafter.

In accordance with the above and other objects of the invention it has been found that tetra-lower alkyl quaternary ammonium iodides and anion exchange resins comprising quaternary ammonium groups and iodide anions readily reduce bis(difluoramino)difluoromethane to difluorodiazirine in excellent yields.

Particularly good results are obtained, for example, by reacting a concentrated solution of tetrabutylammonium iodide in acetonitrile with bis(difluoramino)difluoromethane and recovering difluorodiazirine from the gaseous reaction products. The reaction is apparently given by the equation:

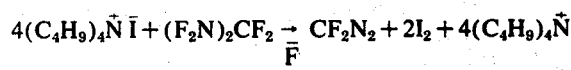

It is unexpectedly found that not only is the quaternary ammonium iodide very soluble, e.g., up to about 25 g. of iodide per 100 grams of acetonitrile but also the quaternary ammonium fluoride is soluble in at least as great molar concentration and therefore does not precipitate.

On the other hand, it is also most surprising to find that substantially insoluble quaternary ammonium iodides, e.g., anion-exchange resins characterized by quaternary ammonium groups, also are very efficient in the reduction of bis(difluoramino)difluoromethane by the above type of reaction and offer the additional advantage that the iodine produced in the reaction is retained in the resin.

The valuable results achieved employing quaternary ammonium iodides in the process of the invention are unexpected inasmuch as neither barium or hydrogen iodide is even as useful as the potassium salt indicating the non-equivalence of the cations of the reducing agents. In general the solubilities of relatively low-molecular weight quaternary ammonium iodides in acetonitrile decrease as the total number of carbon atoms decreases but it will be evident, in view of the insolubility of the ion-exchange resins, that the solubility of quaternary ammonium iodides is not the controlling characteristic thereof. It appears that for some empirical reason quaternary ammonium iodides as a class are peculiarly adapted to provide reactive iodide ions in substantially anhydrous media.

The following examples further illustrate the process of the invention and the best mode presently contemplated for practicing the invention.

EXAMPLE 1

Bis(difluoramino)difluoromethane is added to four times the molar amount of tetrabutylammonium iodide as a concentrated to saturated solution in acetonitrile having a concentration of from about 1 to 1.6 molar. Reaction takes places rapidly and exothermicly at room temperature with the evolution of gaseous difluorodiazirine which is collected by condensation in a suitable trap. The yield is of the order of 90 mole percent as against about 30 mole percent using potassium iodide in 95:5 acetonitrile-water as is necessary to achieve roughly one-fourth the solubility of iodide. The difluorodiazirine thus obtained is found to be of a purity of the order of 95 percent by infrared spectroscopy and gas chromatography.

When this procedure is repeated employing comparable concentrations of tetramethylammonium and tetrahexylammonium iodides, excellent yields of difluorodiazirine are obtained.

On a larger scale reaction is carried out similarly employing glass lined reactors or larger glass vessels observing the precautions which are prudent for handling energetic compounds.

EXAMPLE 2

In another embodiment of the invention, a glass column 2 inches in diameter and 36 inches long is packed with ceramic saddles and provided with stainless steel inlets and outlets at top and bottom so that liquid can be introduced at the top and gas removed there and conversely at the bottom. A solution of 2.0 kg. of tetra-n-butylammonium iodide in 6 liters of acetonitrile stored in a reservoir is allowed to flow through the packed glass column from top to bottom at a rate of about 350–400 grams per hour (total time 15 hours) and simultaneously vapors of bis(difluoramino)difluoromethane containing about 10 percent by volume of added nitrogen are passed upward through the packed column at a rate of 15 g. per hour and led to a stainless steel trap cooled in liquid nitrogen. A total of about 80 g. of difluorodiazirine of 95 percent purity is collected from the off-gases in 15 hours of running.

EXAMPLE 3

This example illustrates the process of the invention employing an insoluble quaternary ammonium anion-exchange resin. One such resin is a 50 to 100 mesh powder in the chloride form containing trimethylbenzylammonium groups attached to carbon chains at the paraposition of the benzyl groups. About 4 percent of divinylbenzene is believed to provide cross-linking. Inasmuch as porosity and surface for reaction are necessary, extensively cross-linked exchange resins, although operable, are less efficient.

A portion of the above resin is converted to the iodide form by exchange with an aqueous solution of iodide, e.g., sodium or potassium, and after rinsing to remove excess inorganic salts is washed with acetonitrile to remove substantially all water. Four milliequivalents of iodide as the resin (i.e., about 0.3 ml.)

is placed in a reaction vessel (10 ml. capacity) in a gas transfer system together with 0.5 ml. of acetonitrile. The vessel is cooled to about −190°C. and evacuated and 15 mgm. (1 milliequivalent) of bis(difluoramino)difluoromethane is transferred to the vessel by condensation. The mixture is permitted to warm to room temperature and during 1.5 hours about 50 percent conversion to difluorodiazirine is attained. Further time of reaction and intermittent agitation increase the conversion.

Those skilled in the art will readily recognize that continuous processing of the spent acetonitrile solution in Example 2 above and of the exchange resin in Example 3 could be employed to regenerate the quaternary ammonium iodide and recover solvent.

What is claimed is:

1. A process for the production of difluorodiazirine comprising the steps of
   I. reducing difluorobis(difluoramino)methane with tetra-lower alkyl quaternary ammonium iodide or anion exchange resin comprising quaternary ammonium groups and iodide anions and
   II. recovering difluorodiazirine as a product of the reaction.

2. The process of claim 1 wherein tetrabutylammonium iodide is employed in solution in acetonitrile.

3. The process according to claim 1 wherein vapors of difluorobis(difluoramino)methane pass countercurrent to a solution of tetrabutylammonium iodide in acetonitrile and difluorodiazirine is condensed from the off-gases.

4. The process according to claim 1 wherein substantially insoluble anion-exchange resin comprising quaternary ammonium groups and iodide anions is employed as reducing agent.

* * * * *